(12) United States Patent
Chiang et al.

(10) Patent No.: US 12,307,258 B2
(45) Date of Patent: May 20, 2025

(54) SYSTEMS AND METHODS FOR EFFICIENT TRANSFER OF DATA TO A BASEBOARD MANAGEMENT CONTROLLER

(71) Applicant: Quanta Computer Inc., Taoyuan (TW)

(72) Inventors: Chun-Hsien Chiang, Taoyuan (TW); Ming-Heng Wu, Taoyuan (TW); Huang-Ren Ou, Taoyuan (TW); Shih-Hsuan Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 22 days.

(21) Appl. No.: 18/348,809

(22) Filed: Jul. 7, 2023

(65) Prior Publication Data

US 2025/0013473 A1 Jan. 9, 2025

(51) Int. Cl.
*G06F 9/4401* (2018.01)
*H04L 41/22* (2022.01)

(52) U.S. Cl.
CPC ............ *G06F 9/4401* (2013.01); *G06F 9/441* (2013.01); *H04L 41/22* (2013.01)

(58) Field of Classification Search
CPC ......... G06F 9/4401; G06F 9/441; H04L 41/22
See application file for complete search history.

(56) References Cited

U.S. PATENT DOCUMENTS

2016/0006619 A1* 1/2016 Maity ..................... H04L 41/22
715/733
2017/0154688 A1* 6/2017 Kim .................... G06F 11/1451
2017/0337064 A1 11/2017 Vidyadhara et al.
2020/0097299 A1* 3/2020 Huang ................ G06F 9/44505
2020/0143047 A1* 5/2020 Shivanna ............... H04L 9/3247
2021/0141626 A1* 5/2021 Ladkani ................ G06F 3/0676

FOREIGN PATENT DOCUMENTS

| CN | 108052353 A | 5/2018 |
| CN | 114265905 A | 4/2022 |
| CN | 114328102 A | 4/2022 |
| TW | 201523241 A | 6/2015 |
| TW | 201810039 A | 3/2018 |
| TW | 202036282 A | 10/2020 |

OTHER PUBLICATIONS

TW Office Action for Application No. 112138212 mailed Jun. 25, 2024, w/ First Office Action Summary, 9 pp.
TW Search Report for Application No. 12138212 mailed Jun. 25, 2024, w/ First Office Action, 1 p.

* cited by examiner

*Primary Examiner* — Terrell S Johnson
(74) *Attorney, Agent, or Firm* — NIXON PEABODY LLP (57) ABSTRACT

A computing system includes a memory storing basic input output system (BIOS) firmware, and a controller coupled to the memory device. The controller is configured to execute the BIOS firmware to store current data associated with the computing system in the memory device. The current data is divided into a plurality of distinct data groups. The controller is further configured to execute the BIOS firmware to compare the current data with reference data associated with the computing system that is stored in the memory device. The controller is further configured to execute the BIOS firmware to transmit, to a predetermined destination, the current data of each respective data group where the current data of the respective data group is different than the reference data of the respective data group.

19 Claims, 3 Drawing Sheets

SYSTEMS AND METHODS FOR EFFICIENT TRANSFER OF DATA TO A BASEBOARD MANAGEMENT CONTROLLER

FIELD OF THE INVENTION

The present disclosure relates generally to systems and methods for transferring data to a baseboard management controller of a computing system, and more specifically, to systems and methods for transferring data to a baseboard management controller by transferring only the changed portions of the data to the baseboard management controller.

BACKGROUND OF THE INVENTION

Computing systems include a variety of different components, including a controller and a basic input output system (BIOS). The BIOS is firmware that can be executed by the controller to perform a variety of basic functions, particularly when the computing system is initially powered on. For example, the controller can execute the BIOS firmware to collect a large variety of data about components of the computing system and send that data to a predetermined destination (such as a baseboard management controller). However, depending on the amount and format of the data, it can be time-consuming to collect and transmit all of this data every time that the computing system is powered on. Thus, new systems and methods for transferring the data are needed.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In a first implementation, the present disclosure is directed to a computing system that includes a memory device and a controller coupled to the memory device. The memory device stores basic input output system (BIOS) firmware. The controller is configured to execute the BIOS firmware to collect current data associated with the computing system in the memory device. The current data is divided into a plurality of data groups. The controller is further configured to execute the BIOS firmware to compare the current data with reference data associated with the computing system. The reference data is also divided into the plurality of data groups. The controller is further configured to execute the BIOS firmware to transmit, to a predetermined destination, the current data of each respective data group having the current data different than the reference data.

In some aspects of the first implementation, the predetermined destination is a memory device of a baseboard management controller (BMC) of the computing system.

In some aspects of the first implementation, the controller is further configured to execute the BIOS firmware to classify the current data into the plurality of data groups and generate a current data table that includes a plurality of sections. Each respective section of the current data table corresponds to one of the plurality of data groups and contains the current data of the corresponding data group of the plurality of data groups. Comparing the current data with the reference data includes comparing, for each respective data group of the plurality of data groups, (i) the section of the current data table that corresponds to the respective data group with (ii) a section of a reference data table that corresponds to the respective data group.

In some aspects of the first implementation, the section of the current data table that corresponds to each respective data group of the plurality of data groups includes (i) the current data of the respective data group, (ii) a current checksum value associated with the current data of the respective data group, and (iii) a change flag associated with the current data of the respective group relative to the reference data of the respective group.

In some aspects of the first implementation, the section of the reference data table that corresponds to each respective data group of the plurality of data groups includes a reference checksum value associated with the reference data of the respective data group. Comparing the current data to the reference data includes, for each respective data group of the plurality of data groups, comparing (i) the current checksum value of the corresponding section in the current data table to (ii) the reference checksum value of the corresponding section in the reference data table.

In some aspects of the first implementation, the controller is further configured to execute the BIOS firmware to, for each respective data group of the plurality of data groups having the current checksum value matching the reference checksum value, set the change flag of the respective data group to an unchanged value.

In some aspects of the first implementation, the controller is further configured to execute the BIOS firmware to, for each respective data group of the plurality of data groups having the current checksum value not matching the reference checksum value, set the change flag of the respective data group to a changed value.

In some aspects of the first implementation, transmitting the current data of each respective data group of the plurality of data groups having the current data different than the reference data includes, for each respective section of the current data table having the change flag set to the changed value, transmitting the current data of the respective section of the current data table to the predetermined destination.

In some aspects of the first implementation, the controller is further configured to execute the BIOS firmware to, for each respective section of the current data table having the change flag set to the changed value, overwrite the reference data of the corresponding section of the reference data table with the current data of the respective section of the current data table.

In some aspects of the first implementation, the controller is further configured to execute the BIOS firmware to, for each respective data group of the plurality of data groups having the current data different than the reference data, replace the reference data of the respective data group in the reference data table with the current data of the respective data group.

In a second implementation, the present disclosure is directed to a method that comprises collecting current data associated with the computing system. The current data is divided into a plurality of distinct data groups. The method further comprises comparing the current data with reference data associated with the computing system. The reference data is also divided into the plurality of data groups. The method further comprises transmitting, to a predetermined destination, the current data of each respective data group of the plurality of data groups having the current data different than the reference data.

In some aspects of the second implementation, the predetermined destination is a memory device of a baseboard management controller (BMC) of the computing system.

In some aspects of the second implementation, the method further comprises classifying the current data into the plurality of distinct data groups and generating a current data table that includes a plurality of sections. Each respective section corresponds to one of the plurality of data groups and contains the current data of the corresponding data group. Comparing the current data with the reference data includes comparing, for each respective data group of the plurality of data groups, (i) the section of the current data table that corresponds to the respective data group with (ii) a section of a reference data table that corresponds to the respective data group.

In some aspects of the second implementation, the section of the current data table that corresponds to each respective data group of the plurality of data groups includes (i) the current data of the respective data group, (ii) a current checksum value associated with the current data of the respective data group, and (iii) a change flag associated with the current data of the respective group relative to the reference data of the respective group.

In some aspects of the second implementation, the section of the reference data table that corresponds to each respective data group of the plurality of data groups includes a reference checksum value associated with the reference data of the respective data group. Comparing the current data to the reference data includes, for each respective data group of the plurality of data groups, comparing (i) the current checksum value of the corresponding section in the current data table to (ii) the reference checksum value of the corresponding section in the reference data table.

In some aspects of the second implementation, the method further comprises, for each respective data group of the plurality of data groups having the current checksum value matching the reference checksum value, setting the change flag of the respective data group to an unchanged value.

In some aspects of the second implementation, the method further comprises, for each respective data group of the plurality of data groups having the current checksum value not matching the reference checksum value, setting the change flag of the respective data group to a changed value.

In some aspects of the second implementation, transmitting the current data of each respective data group of the plurality of data groups having the current data different than the reference data includes, for each respective section of the current data table having the change flag set to the changed value, transmitting the current data of the respective section of the current data table to the predetermined destination.

In some aspects of the second implementation, the method further comprises, for each respective section of the current data table having the change flag set to the changed value, overwriting the reference data of the corresponding section of the reference data table with the current data of the respective section of the current data table.

In some aspects of the second implementation, the method further comprises, for each respective data group of the plurality of data groups having the current data different than the reference data, replacing the reference data of the respective data group in the reference data table with the current data of the respective data group.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments and are therefore not to be considered as limitations on the scope of the various embodiments or claims.

DETAILED DESCRIPTION

The examples disclosed herein relate to a computing system that includes a memory device storing BIOS firmware, and a controller coupled to the memory device. The controller is configured to execute the BIOS firmware to implement a method. When the computing system is powered on, the controller collects current data that is associated with the computing system (e.g., data associated with the current status of various hardware components of the computing system). The current data can be divided into a plurality of distinct data groups. The controller can compare each data group of the current data to reference data. Generally, the reference data is an earlier-in-time counterpart to the current data, and also includes the same number of distinct data groups. The controller can flag any data groups of the current data that have changed relative to the reference data, and then transmit the changed data groups of the current data to a predetermined destination (such as a baseboard management controller), instead of transmitting all of the current data. The controller can also replace the reference data for the changed data groups with the current data, such that the reference data is updated with the most recent version of each data group and can be used for a subsequent power on of the computing system.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 1:
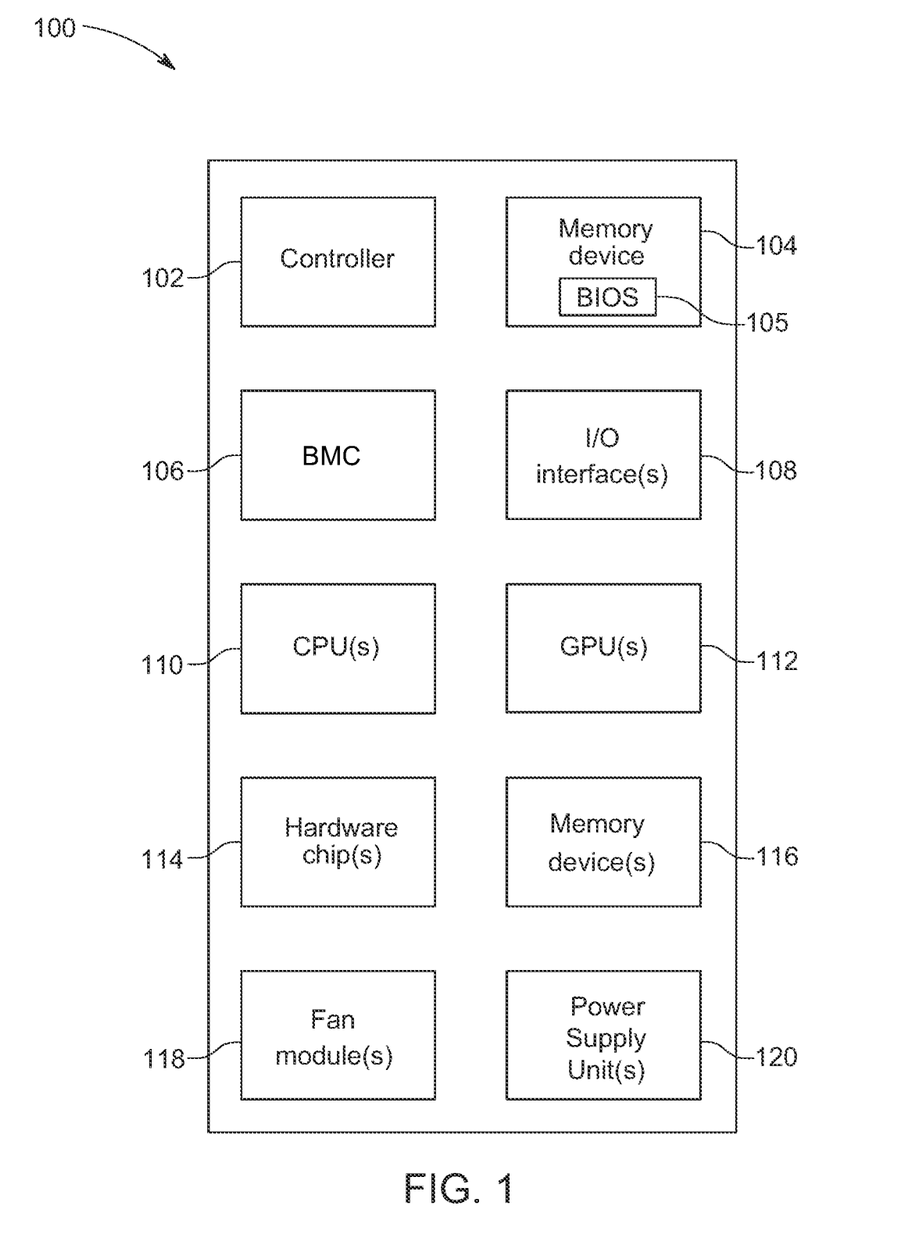
FIG. 1 is a block diagram of a computing system, according to aspects of the present disclosure.

FIG. 1 illustrates a block diagram of a computing system 100 according to certain aspects of the present disclosure. In some implementations, the computing system 100 is a server, but the principles disclosed herein may be incorporated into any computing system having one or more of the components described herein. The computing system 100 includes a controller 102, a memory device 104, and a baseboard management controller (BMC) 106. The controller 102 is a processing device containing one or more processors and/or processor cores, and is configured to execute machine-readable instructions stored in the memory device 104 (and/or any other memory devices of the computing system 100) to perform various different tasks. In some implementations, the controller 102 is the central processing unit (CPU) or the graphics processing unit (GPU) of the computing system 100. In other implementations, the controller 102 is separate from the CPU and the GPU.

The memory device 104 can generally be any suitable memory device, such as random access memory (RAM) dynamic RAM (DRAM), static RAM (SRAM), read-only memory (ROM), programmable ROM (PROM), erasable PROM (EPROM), electrically erasable PROM (EEPROM), a hard drive, flash storage, etc. In some implementations, the memory device 104 is non-volatile RAM (NVRAM), which has its own battery such that data stored in the NVRAM is retained therein when the computing system 100 is powered off.

The memory device 104 includes basic input output system (BIOS) firmware 105, which is a set of instructions stored in the memory device 104 that can be executed by the controller 102 when the computing system 100 is powered on. The BIOS firmware 105 can be executed to perform a variety of different basic tasks, include initializing and testing various components of the computing system 100 when the computing system 100 is powered on (generally referred to as executing the power-on self-test (POST) routine), loading the bootloader from a separate memory device (generally a hard drive or flash storage), etc.

The BMC 106 is a specialized controller for managing operations of the computing system 100, and generally includes its own processing unit and memory device. The BMC 106 can allow for remote monitoring of various different components of the computing system 100. In some implementations, the BMC 106 is used to implement the Intelligent Platform Management Interface (IPMI) standard.

The computing system 100 can include a variety of different hardware components that can be used to perform a variety of different computing tasks. In some implementations, these hardware components can include one or more input/output (I/O) interfaces 108 (e.g., a PCIe interface, a network interface (wired and/or wireless), a USB interface, etc.), one or more central processing units (CPU) 110, one or more graphics processing units (GPU) 112, one or more hardware chips 114 (e.g., northbridge chip, southbridge chip, etc.), one or more memory devices 116 (e.g., the RAM of the computing system 100, which is generally separate from the memory device 104 that stores the BIOS firmware 105), one or more fan modules 118, one or more power supply units 120, or any combinations thereof. The computing system 100 may also include additional hardware components.

Figure 2:
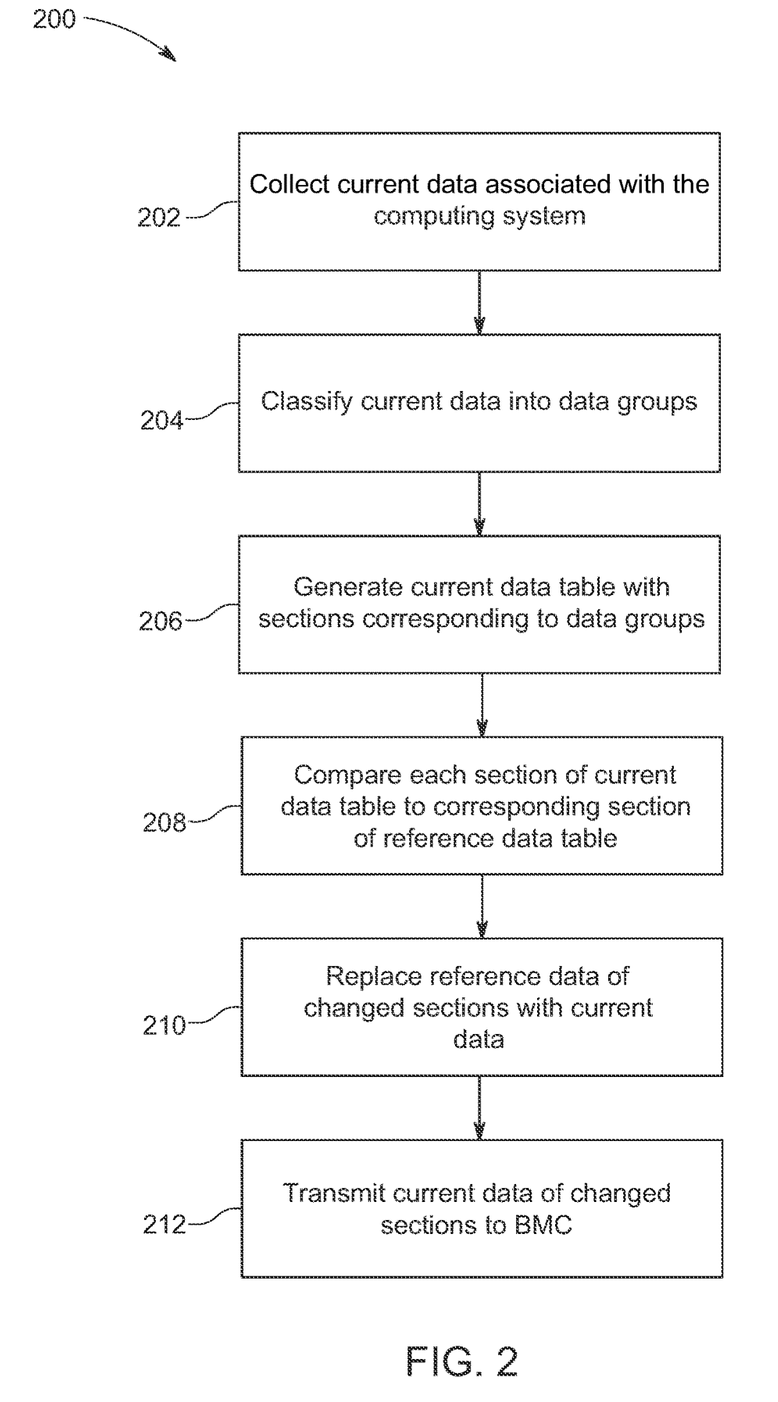
FIG. 2 is a flowchart of a method for collecting data associated with the computing system and transferring the data to a baseboard management controller of the computing system, according to aspects of the present disclosure.

FIG. 2 is a flowchart of a method 200 that can be implemented by the controller 102 when the controller 102 executes at least a portion of the BIOS firmware 105. In general, the method 200 is implemented when the computing system is powered on, for example as part of the POST routine that the controller 102 reads from the BIOS firmware 105 and implements in response to the computing system 100 being powered on. In other implementations however, the method 200 may be implemented at any point during the operation of the computing system 100.

Step 202 of the method 200 includes collecting current data associated with the computing system 100. The current data can be stored, for example, in the memory device 104 and/or any other memory device of the computing system 100. The current data associated with the computing system 100 is often representative of the identity and/or status of the various different hardware components of the computing system 100 when the computing system 100 has just been powered on. For example, the current data can include data associated with the number and type of any of the I/O interfaces (e.g., the number of PCIe cards, any network connections, etc.), data associated with any of the fan modules 118, data associated with any of the power supply units 120, etc. Thus, the current data that is stored in step 202 is generally associated with the computing system 100 at the time of the current power-on of the computing system 100. In some implementations, the controller 102 is operable to request the current data from the various different components of the computing system 100, and then store the current data in the memory device 104. In other implementations, the controller 102 does not request the current data, but only receives the current data and stores the current data in the memory device 104.

Step 204 of the method 200 includes classifying the current data into a plurality of distinct data groups. The current data can be analyzed on the level of these data groups and can generally be classified into the data groups in any desirable manner. For example, the plurality of data groups can include a first data group associated with the CPU 110 of the computing system 100, a second data group associated with the memory devices the memory device(s) 116 of the computing system 100 (in addition to or other than the memory device 104), a third data group associated with I/O interfaces 108 such as PCIe slots (and/or devices connected to the PCIe slots) of the computing system 100, and other data groups. In some implementations, the current data is received in a single chunk or segment, and the controller 102 analyzes the current data and sorts it into the different data groups. in other implementations, the controller 102 receives the current data already classified into the different data groups.

Step 206 of the method 200 includes generating a current data table in the memory device 104 (and/or any other memory devices of the computing system 100) into which the current data is stored. The current data table is divided into a plurality of different sections, where each respective section corresponds to one of the plurality of data groups and contains the current data of that corresponding data group. For example, the current data table may have a first section containing the current data of the first data group associated with the CPU 110, a second section containing the current data of the second data group associated with the memory device(s) 116, a third section containing the current data of the third data group associated with the I/O interfaces 108, and other sections.

In some implementations, the current data table is generated in the memory device 104 separately from step 202 when the current data is received. For example, the current data can be temporarily stored in one place in the memory device 104 after being collected in step 202, and then can rearranged within the memory device 104 to form the current data table. This may be the case in implementations where the current data is collected as a whole and the controller 102 then analyzes the current data to sort the current data into the separate data groups. In other implementations, the controller 102 collects the current data and generates the data table in the memory device 104 as part of a single step, such that steps 202 and 206 can be considered to be one step. This may be the case where the controller 102 receives the current data already sorted into the data groups, such that the controller 102 stores the current data in current data table within the memory device 104 as the current data is received.

Figure 3:
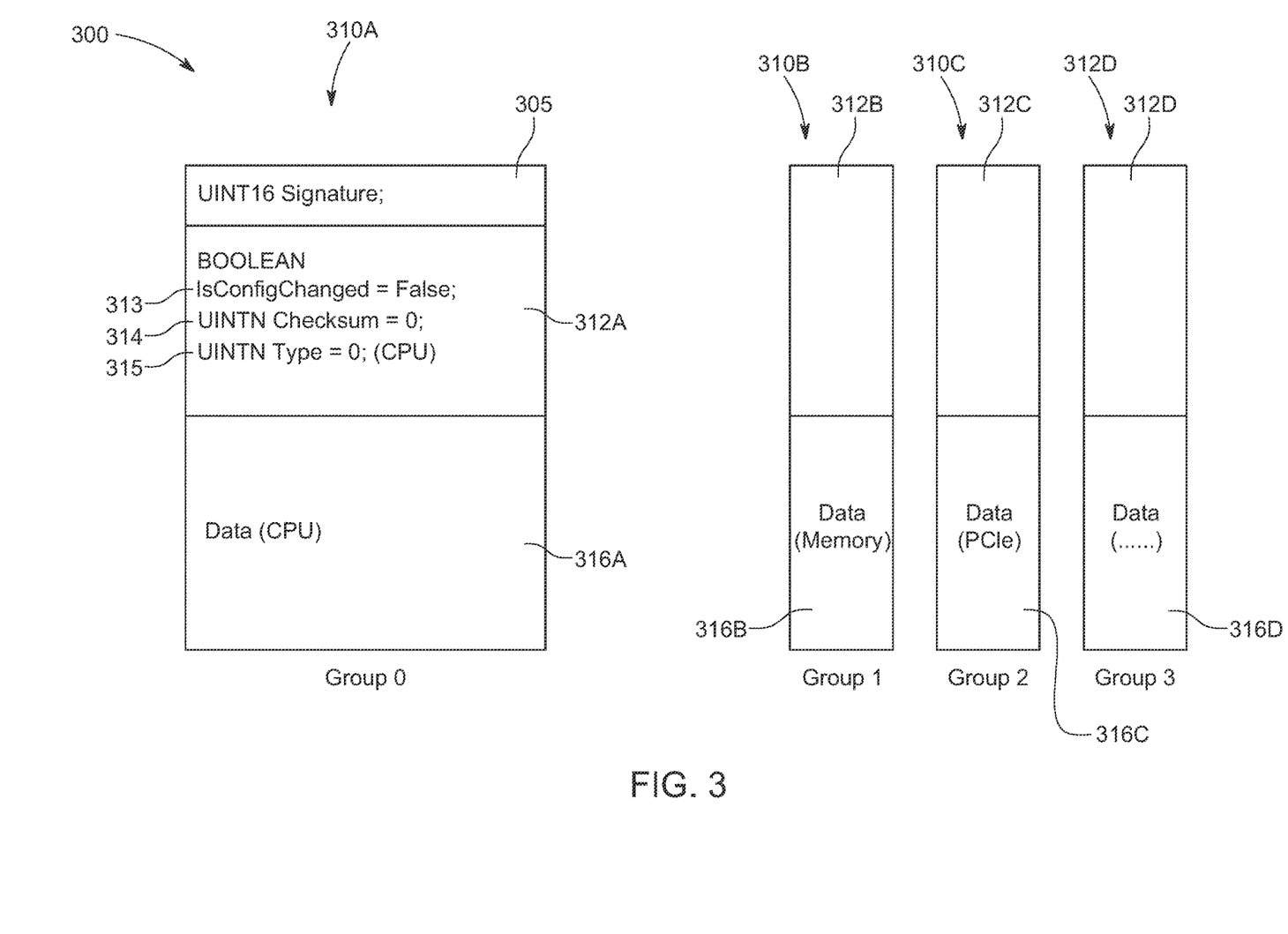
FIG. 3 illustrates a data table in which the data associated with the computing system can be stored, according to aspects of the present disclosure.

FIG. 3 shows an example of a current data table 300 that can be stored in the memory device 104. As shown, the current data table 300 includes a first section 310A (labeled "Group 0") corresponding to a first data group, a second section 310B (labeled "Group 1") corresponding to a second data group, a third section 310C (labeled "Group 2") corresponding to a third data group, and a fourth section 310D (labeled "Group 3") corresponding to a fourth data group. Each section 310A-310D of the current data table 300 includes a header with information about the current data of that data group, and a data repository where the current data of the data group is stored. The first section 310A includes a header 312A and a data repository 316A. The second section 310B includes a header 312B and a data repository 316B. The third section 310C includes a header 312C and a data repository 316C. The fourth section 310D includes a header 312D and a data repository 316D. The current data table 300 also includes a starting signature 305, which is shown as an unsigned integer called "Signature." The starting signature 305 indicates the location in the memory device 104 of the start of the current data table 300. Thus, the starting signature is generally located right before the beginning of the 3 first section 310A in the memory device 104.

The headers 312A-312D include a variety of different information about the current data in the sections 310A-310D that the controller 102 can utilize during the method 200. In the current data table 300, the header 312A of the first section 310A includes a change flag 313, a checksum 314, and a data group type indicator 315. The change flag 313 is a variable that can indicate whether the current data in the data repository 316A of the first section 310A has changed, as discussed in more detail herein. In the illustrated implementation, the change flag 313 is shown as a Boolean variable called "IsConfigChanged" with a value of "False." However, the change flag 313 could generally be any type of variable, so long as the change flag 313 can be set to a changed value (indicating that the current data has changed) and an unchanged value (indicating that the current data has not changed). The change flag (not shown) of each of the other section 310B-310D will generally the same format as the change flag 313.

The checksum 314 is representative of the content of the current data of the first data group that is stored in the data repository 316A of the first section 310A. The checksum 314 can be calculated according to any suitable checksum algorithm capable of representing the content of the current data of the first data group as a smaller-size value. Possible checksum algorithms include as the BSD checksum algorithm, the SYSV checksum algorithm, the xor8 algorithm, the Luhn algorithm, the Verhoeff algorithm, the Damm algorithm, and others. In some implementations, algorithms other than checksum algorithms can be used, such as cyclic redundancy checks, or cryptographic hash functions. In the illustrated implementation, the checksum 314 is shown as an unsigned integer called "Checksum" with a value of "0." However, the checksum 314 could generally be any type of variable, so long as the value of the checksum 314 can represent the content of the current data. The checksum (not shown) of each of the other sections 310B-310D will generally the same format as the checksum 314.

The data group type indicator 315 identifies which data group each of the different sections 310A-310D corresponds to. In the illustrated implementation, the data group type indicator 315 is shown as an unsigned integer called "Type" with a value of "0." However, the data group type indicator 315 could generally be any type of variable, so long as the potential values of the data group type indicator 315 can represent all of the different data groups. The data group type indicator (not shown) of each of the other sections 310B-310D will generally the same format as the data group type indicator 315.

In the illustrated implementation, data group type 0 corresponds to data about the CPU, data group type 1 corresponds to data about the memory, data group type 2 corresponds to data about PCIe interfaces, and data group type 3 corresponds to some other type of data. However, in other implementations, the various different data group types can correspond to data about any suitable device, system, category, etc.

When the current data table is initially generated in the memory device 104 (e.g., when the current data is collected or at some point in time afterward), the value of the change flags of the different data groups can be set to the unchanged value (e.g., "False" if the change flags are Boolean variables with possible values of True and False), the value of the checksums can be calculated and set according to the algorithm being used, and the value of the data group type indicators can be set according to the specific data types in the current data table 300.

Referring back to FIG. 2, step 208 of the method 200 includes comparing the current data with reference data. The reference data is generally an earlier-in-time correspondent to the current data and can be divided into a plurality of data groups. While the current data is associated with the computing system 100 at the time of the most recent power-on of the computing system 100, the reference data is associated with the computing system 100 at the time of one or more prior power-ons of the computing system 100 before the most recent power-on. For example, the reference data may include information about the status of various hardware components from the most recent time the computing system was powered on prior to the current power-on of the computing system 100. In another example, the reference data may include information about the status of some of the hardware components from the most recent power-on of the computing system 100, and information about the status of others of the hardware components from an even earlier power-on of the computing system 100.

In some implementations, the reference data is stored in a reference data table within the memory device 104 (and/or any other memory devices of the computing system 100). Generally, the reference data table will have the same format as the current data table (such as the current data table 300 illustrated in FIG. 3), and each data group of the reference data will be stored in a specific section of the reference data table. Thus, comparing the current data to the reference data can include comparing each section of the current data table (e.g., the data repository of each section of the current data table) to the corresponding section of the reference data table (e.g., the data repository of the corresponding section of the reference data table).

In some implementations, the current data of each section in the current data table is not directly compared to the reference data to the corresponding section of the reference. Instead, the individual checksum values of the corresponding sections of the current data table and the reference data table can be compared. Thus, for each data group, the checksum value in the section of the current data table for that data group (e.g., the current checksum value) can be compared to the checksum value in the section of the reference data table for that data group (e.g., the reference checksum value).

If the current and reference checksum values match, then the current data for the data group has not changed relative to the reference data for the data group. If the current and reference checksum values do not match, then the current data for the data group has changed relative to the reference data for the data group. Thus, if the current and reference checksum values match, the change flag of the data group in the current data table (e.g., the change flag in the header of the section of the current data table corresponding to that data group) can be set to the unchanged value (or can remain set to the unchanged value if already set to the unchanged value). If the current and reference checksum values do not match, the change flag of the data group in the current data table can be set to the changed value (or can remain set to the changed value if already set to the changed value).

Step 210 of the method 200 includes replacing any portion of the reference data that has changed with the corresponding portion of the current data. If the data for any data group has changed from the time the reference data for that data group was collected to the time the current data for that data group was collected, the reference data for that data can be replaced with the current data for that data group. For example, if the reference data indicates that the computing system 100 included a first configuration of RAM (e.g., four separate 4 GB RAM modules) at the prior power-on of the computing system 100, but that computing system 100 now includes a second configuration of RAM (e.g., four separate 8 GB RAM modules), then the portion of the reference data associated with this information can be replaced with the corresponding portion of the current data. Then, during a subsequent power-on of the computing system 100, this portion of the reference data would then indicate that the computing system 100 has the second configuration of RAM instead of the first configuration of RAM. Thus, step 210 can include, for each respective data group having the current data different than the reference data, replacing the reference data of the respective data group with the current data of the respective data group.

In implementations that utilize the current data table and the reference data table, replacing the changed data includes overwriting, in the memory device 104, the reference data of any section in the reference data table with the current data of the corresponding section of the current data table. Thus, the current data for a changed section/data group will become the reference data for that section/data group the next time that the method 200 is implemented (e.g., the next time that the computing system 100 is powered on).

In implementations where the current data table includes change flags (e.g., implementations using the reference data table 300 of FIG. 3), step 210 can include identifying the sections of the current data table where the change flag is set to the changed value. The reference data in the corresponding section of the reference data table in the memory device 104 can then be overwritten with the current data from the sections of the current data table where the changed flag is set to the changed value.

Thus, after step 210 is complete, the reference data table has been updated to reflect the most recent version of each data group. For any data groups that changed when the current data was collected at step 202, that current data is now stored in the reference data table (as well as still being stored in the current data table). For any data groups that did not change when the current data was collected at step 202, the reference data (which is identical to the current data) remains stored in the reference data table. Thus, any time that the computing system 100 is powered on, the reference data table will reflect the most recent version of each of the data groups, whether the most recent version of a data group originated from the immediately prior time the computing system 100 was powered on, or from an even more prior power-on of the computing system 100.

Step 212 of the method 200, includes transmitting any data that has changed to the BMC 106. Generally, the BMC 106 stores data about the various different hardware components of the computing system 100, and this data is not erased from the BMC 106 when the computing system 100 is powered off. This data can be used, for example, to implement the BMC 106's remote management features. By having controller 102 determine which data associated with the computing system 100 has changed relative to the last time that the computing system 100 was powered on, the controller 102 only has to transmit the changed data to the BMC 106, instead of all of the data. Thus, step 212 can include, for each respective data group having the current data different than the reference data, transmitting the current data to the predetermined destination.

In implementations that utilize the current data table and the reference data table, transmitting the changed data includes transmitting the current data of any section of the current data table that has changed relative to the reference data in the corresponding section in the reference data table. In implementations where the current data table includes change flags (e.g., implementations using the reference data table 300 of FIG. 3), step 212 can include identifying the sections of the current data table where the change flag is set to the changed value. The current in those sections of the current data table can then be transmitted to the BMC 106. In the illustrated implementation, the changed data is sent to the BMC 106, but in other implementations, the data associated with the computing system 100 may be used by some other predetermined destination (e.g., some other device), and the changed data can be sent to this predetermined destination.

Thus, by first determining which data groups have changed relative to the reference data, the controller 102 only has to transmit the changed data to the BMC 106, instead of transmitting all of the current data. This allows for the controller 102 to execute the start-up process faster and more efficiently when the computing system 100 is powered on, and reduces the chances that there will be an error when data is transmitted to the BMC 106.

In some implementations, the method 200 may include more steps or fewer steps than those illustrated in FIG. 2. For example, in some implementations, the method 200 does not include actively classifying the current data into the plurality of data groups. Instead, the current data is already classified into the plurality of data groups when it is collected. In some implementations, the method 200 does not utilize a current data table and a reference data table to compare the current data and the reference data, but instead uses other techniques to compare the current data and the reference data. In some implementations, the method 200 does not include replacing the reference data of data groups having changed data (e.g., having current data different than the reference data).

Although the disclosed embodiments have illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described been above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above-described embodiments. Rather, the scope of the disclosure should be defined in accordance with the following claims and their equivalents.

What is claimed is:

1. A computing system comprising:
    a memory device storing basic input output system (BIOS) firmware and a reference data table containing reference data associated with the computing system, the reference data being classified into a plurality of data groups, the reference data table including a plurality of sections that each correspond to and contain the reference data associated with one of the plurality of data groups; and
    a controller coupled to the memory device, the controller being configured to execute the BIOS firmware to:
        collect current data associated with the computing system;
        classify the current data into the plurality of data groups;
        generate a current data table that contains the current data, the current data table including a plurality of sections that each correspond to and contain the current data associated with one of the plurality of data groups;
        compare, for each respective data group of the plurality of data groups, (i) the current data in the corresponding section of the current data table with (ii) the reference data in the corresponding section of the reference data table; and
        for each respective group of the plurality of data groups where the current data in the corresponding section of the current data table is different than the reference data in the corresponding section of the reference data table, transmit the current data of the respective data group to a predetermined destination.

2. The computing system of claim 1, wherein the predetermined destination is a memory device of a baseboard management controller (BMC) of the computing system.

3. The computing system of claim 1, wherein the section of the current data table that corresponds to each respective data group of the plurality of data groups includes (i) a current checksum value associated with the current data of the respective data group and (ii) a change flag associated with the current data of the respective group relative to the reference data of the respective group.

4. The computing system of claim 3, wherein the section of the reference data table that corresponds to each respective data group of the plurality of data groups includes a reference checksum value associated with the reference data of the respective data group, and wherein comparing the current data to the reference data includes, for each respective data group of the plurality of data groups, comparing (i) the current checksum value of the corresponding section of the current data table to (ii) the reference checksum value of the corresponding section of the reference data table.

5. The computing system of claim 4, wherein the controller is further configured to execute the BIOS firmware to, for each respective data group of the plurality of data groups having the current checksum value matching the reference checksum value, set the change flag of the respective data group to an unchanged value.

6. The computing system of claim 4, wherein the controller is further configured to execute the BIOS firmware to, for each respective data group of the plurality of data groups having the current checksum value not matching the reference checksum value, set the change flag of the respective data group to a changed value.

7. The computing system of claim 6, wherein transmitting the current data of each respective data group of the plurality of data groups having the current data different than the reference data includes, for each respective section of the current data table having the change flag set to the changed value, transmitting the current data of the respective section of the current data table to the predetermined destination.

8. The computing system of claim 6, wherein the controller is further configured to execute the BIOS firmware to, for each respective section of the current data table having the change flag set to the changed value, overwrite the reference data of the corresponding section of the reference data table with the current data of the respective section of the current data table.

9. The computing system of claim 1, wherein the controller is further configured to execute the BIOS firmware to, for each respective data group of the plurality of data groups having the current data different than the reference data, replace the reference data of the respective data group in the reference data table with the current data of the respective data group.

10. A method comprising:
collecting, via a controller configured to execute basic input output system (BIOS) firmware stored in a memory device, current data associated with a computing system, the memory also storing a reference data table containing reference data associated with the computing system, the reference data being classified into a plurality of data groups, the reference data table including a plurality of sections that each correspond to and contain the reference data associated with one of the plurality of data groups;
classifying, via the controller, the current data into the plurality of data groups;
generating, via the controller, a current data table that contains the current data, the current data table including a plurality of sections that each correspond to and contain the current data associated with one of the plurality of data groups;
for each respective data group of the plurality of data groups, comparing, via the controller, (i) the current data in the corresponding section of the current data table with (ii) the reference data in the corresponding section of the reference data table; and
for each respective data group of the plurality of data groups having where the current data in the corresponding section of the current data table is different than the reference data in the corresponding section of the reference data table, transmitting, via the controller, the current data of the respective data group to a predetermined destination.

11. The method of claim 10, wherein the predetermined destination is a memory device of a baseboard management controller (BMC) of the computing system.

12. The method of claim 10, wherein the section of the current data table that corresponds to each respective data group of the plurality of data groups includes (i) a current checksum value associated with the current data of the respective data group and (ii) a change flag associated with the current data of the respective group relative to the reference data of the respective group.

13. The method of claim 12, wherein the section of the reference data table that corresponds to each respective data group of the plurality of data groups includes a reference checksum value associated with the reference data of the respective data group, and wherein comparing the current data to the reference data includes, for each respective data group of the plurality of data groups, comparing (i) the current checksum value of the corresponding section of the current data table to (ii) the reference checksum value of the corresponding section of the reference data table.

14. The method of claim 13, further comprising, for each respective data group of the plurality of data groups having the current checksum value matching the reference checksum value, setting the change flag of the respective data group to an unchanged value.

15. The method of claim 13, further comprising, for each respective data group having the current checksum value not matching the reference checksum value, setting the change flag of the respective data group to a changed value.

16. The method of claim 15, wherein transmitting the current data of each respective data group of the plurality of data groups having the current data different than the reference data includes, for each respective section of the current data table having the change flag set to the changed value, transmitting the current data of the respective section of the current data table to the predetermined destination.

17. The method of claim 15, further comprising, for each respective section of the current data table having the change flag set to the changed value, overwriting the reference data of the corresponding section of the reference data table with the current data of the respective section of the current data table.

18. The method of claim 10, further comprising, for each respective data group of the plurality of data groups having the current data different than the reference data, replacing the reference data of the respective data group in the reference data table with the current data of the respective data group.

19. A computing system comprising:
a memory device storing basic input output system (BIOS) firmware and reference data associated with the computing system, the reference data being divided into the plurality of data groups;
a controller coupled to the memory device, the controller being configured to execute the BIOS firmware to:
collect current data associated with the computing system;
classify the current data into the plurality of data groups;
compare, for each respective data group of the plurality of data groups, (i) the current data of the respective data group with (ii) the reference data of the respective data group; and
for each respective group of the plurality of data groups where the current data different than the reference data, transmit the current data of the respective data group to a predetermined destination.

* * * * *